United States Patent
Dutta et al.

(10) Patent No.: US 6,636,854 B2
(45) Date of Patent: Oct. 21, 2003

(54) METHOD AND SYSTEM FOR AUGMENTING WEB-INDEXED SEARCH ENGINE RESULTS WITH PEER-TO-PEER SEARCH RESULTS

(75) Inventors: Rabindranath Dutta, Austin, TX (US); Steven Michael French, Austin, TX (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 09/732,484

(22) Filed: Dec. 7, 2000

(65) Prior Publication Data

US 2002/0073075 A1 Jun. 13, 2002

(51) Int. Cl.[7] .............................................. G06F 17/30
(52) U.S. Cl. ......................................... 707/10; 709/231
(58) Field of Search .............................. 707/10, 103 R; 709/203, 216, 217, 225, 231; 714/39, 48, 49; 717/108; 370/52

(56) References Cited

U.S. PATENT DOCUMENTS 6,081,518 A * 6/2000 Bowman-Amuah ......... 370/352
6,336,138 B1 * 1/2002 Caswell et al. ............. 709/223
6,477,580 B1 * 11/2002 Bowman-Amuah ......... 709/231
6,529,909 B1 * 3/2003 Bowman-Amuah .......... 707/10

OTHER PUBLICATIONS

Matei, R.; Iamnitchi, A.; Foster, P.; Mapping the Gnutella network Internet Computing, IEEE, vol.: 6 Issue: 1 , Jan./Feb. 2002 Page(s): 50–57.*

Ripeanu, M.;Peer–to–peer architecture case study: Gnutella network Peer–to–Peer Computing, 2001. Proceedings. First International Conference on , Aug. 2001 Page(s): 99–100.*

Hibbard, "Can peer–to–peer grow up?", *Red Herring*, Dec. 4, 2000.

Heltzel, "Search In Progress", *Business 2.0*, Sep. 12, 2000.

"The Gnutella Protocol", http://gnutella.wego.com, Jul. 2, 2000.

"Gnutella Support", http://gnutella.wego.com, Dec. 31, 1999.

"Cap'n Bry's gnutella search", http:capnbry.dyndns.org/gnutella/protocol.php, no date given.

* cited by examiner

*Primary Examiner*—Diane D. Mizrahi
(74) *Attorney, Agent, or Firm*—Leslie A. Van Leeuwen; Joseph R. Burwell

(57) ABSTRACT

A method and system for augmenting conventional search engine results with peer-to-peer search results. Rather than relying solely on an index search in a database that has only indexed a minor portion of the entire World Wide Web, a server-based, peer-to-peer search is initiated in conjunction with the index search. The results from both search processes can be combined so that the user receives an augmented search result with more information than a search result from either process by itself. The entities that are involved in the search can also establish financially rewarding relationships. The server operator agrees to share a percentage of its revenue with peer-to-peer nodes as an incentive to join its registered set of root nodes and expand its peer-to-peer connections. The identified sources of information that provided the search hits can be used by the operator of the search engine in a compensation transaction.

15 Claims, 8 Drawing Sheets

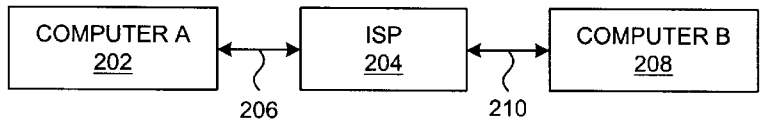
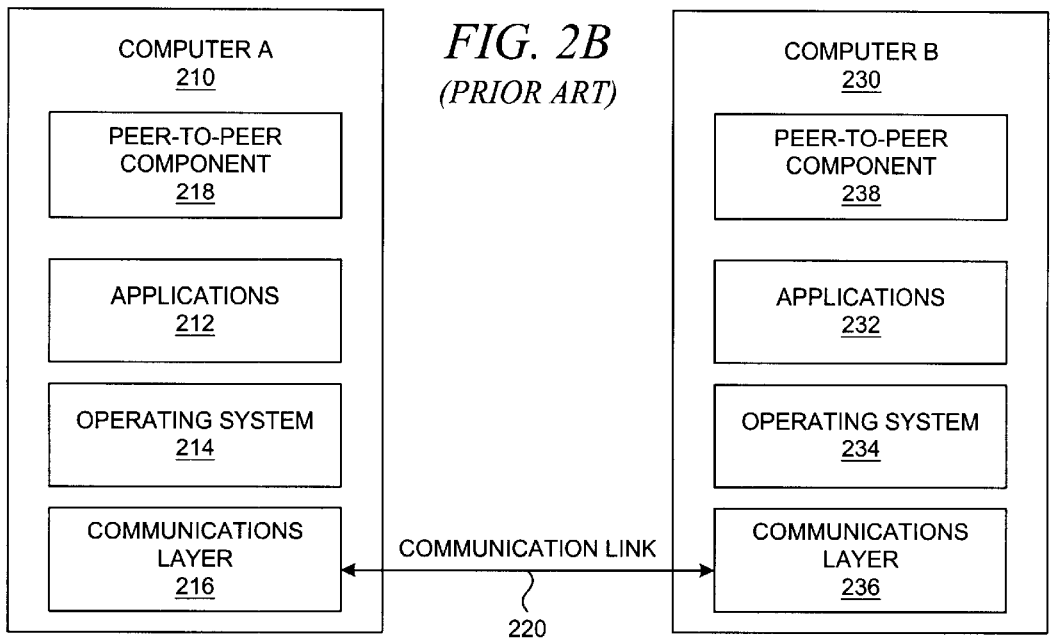
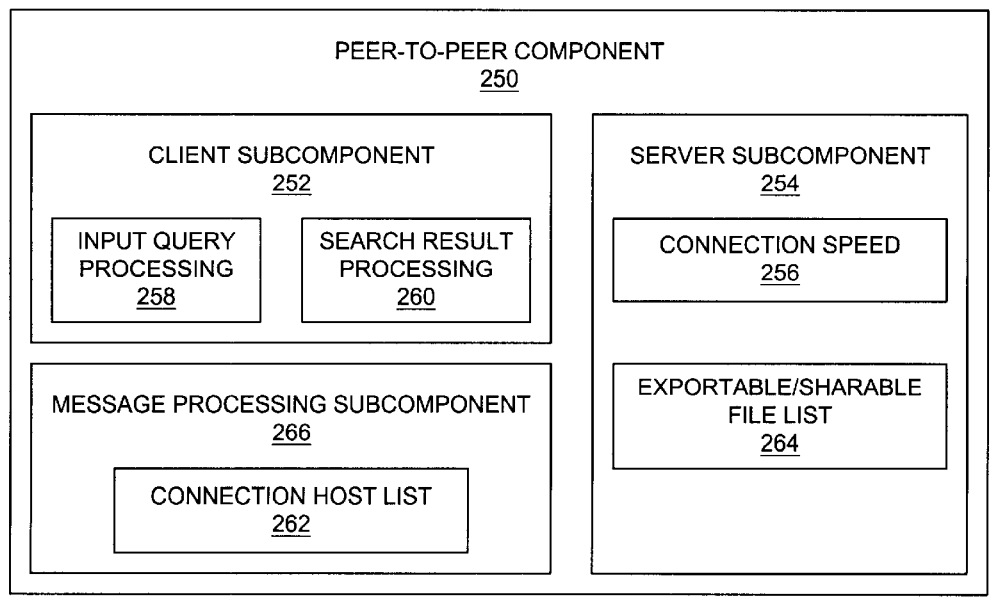

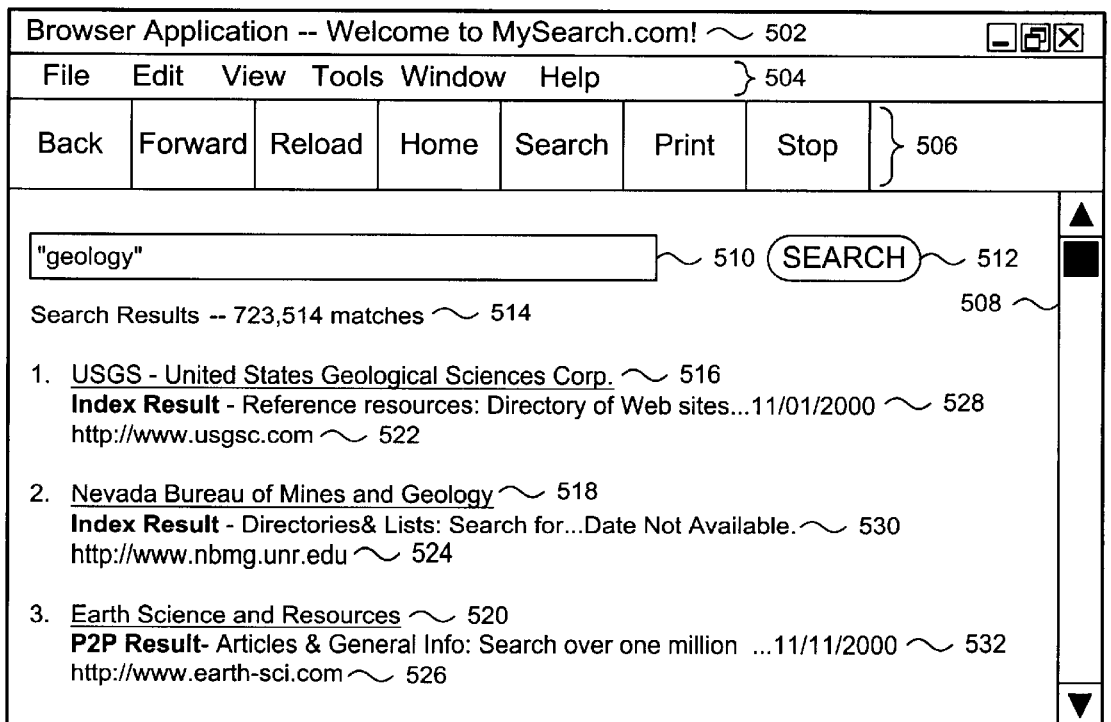
FIG. 5A
```
<a href="http://srd.mysearch.com/drst/2101425/index/1/*http://www.usgsc.com" ...
```
540
.
542
```
<a href="http://srd.mysearch.com/drst/2101425/p2p/1/*http://www.earth-sci.com"...
```
544    546    548
FIG. 5B
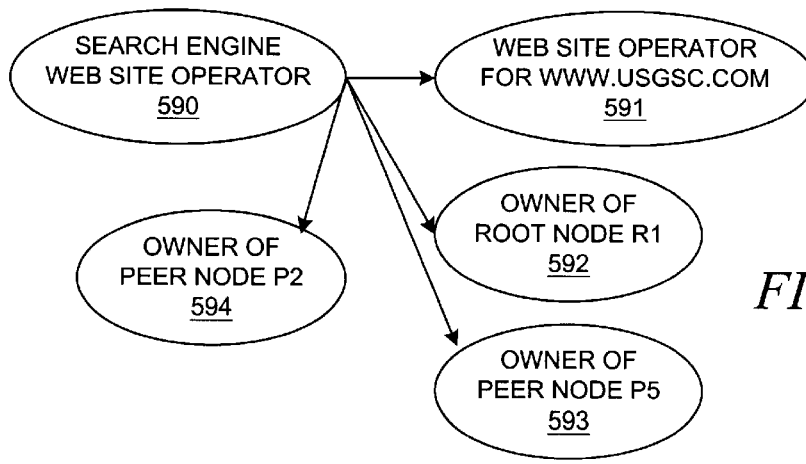
FIG. 5D

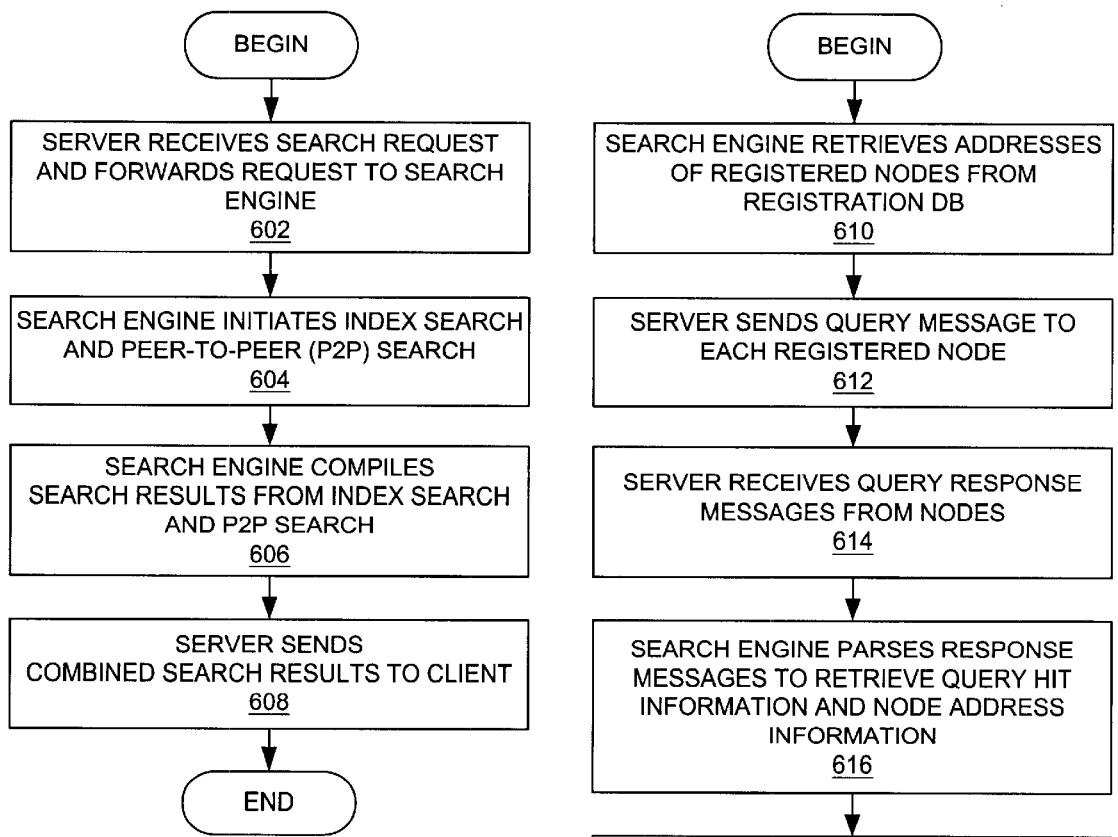
FIG. 6A
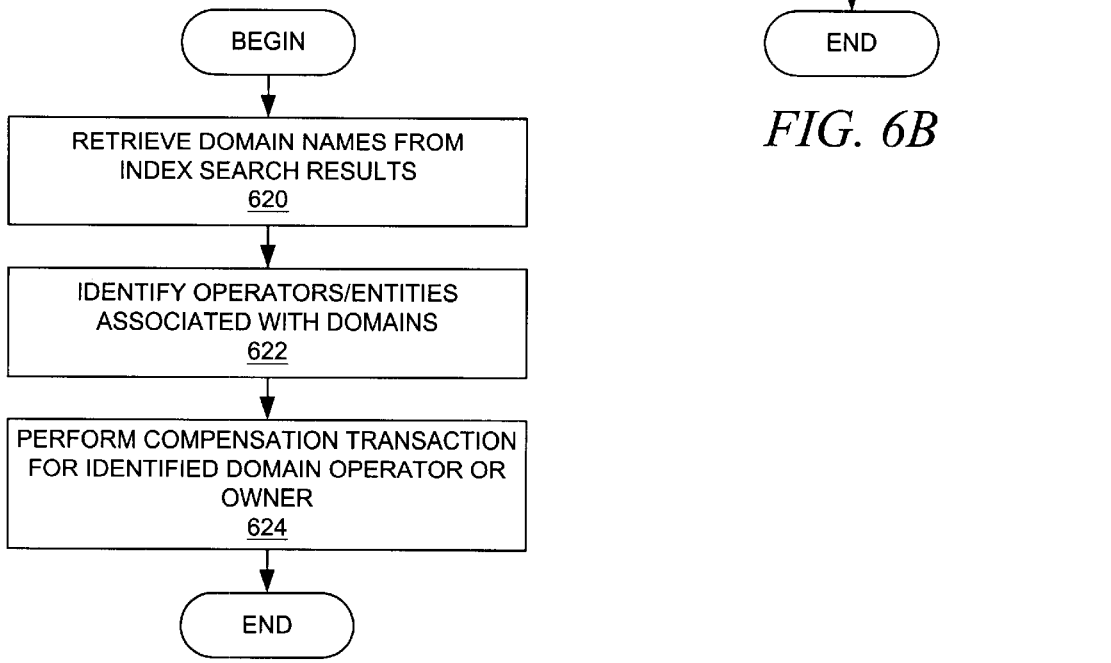
FIG. 6B
FIG. 6C ical computer architecture that may
METHOD AND SYSTEM FOR AUGMENTING WEB-INDEXED SEARCH ENGINE RESULTS WITH PEER-TO-PEER SEARCH RESULTS

BACKGROUND OF THE INVENTION

1. Field of the Invention

The present invention relates to an improved data processing system and, in particular, to a method and system for operating a database. Still more particularly, the present invention provides a method and system for database and/or file accessing and searching.

2. Description of Related Art

The amount of Internet content continues to grow rapidly and to outpace the ability of search engines to index the exploding amount of information. The largest search engines cannot keep up with the growth as it has been estimated that search engines only index about 5% to 30% of the information content on the Web. Hence, at the current time, the majority of Web content is not classified or indexed by any search engine.

There are currently two broad categories of systems which provide the service of categorizing and locating information on the Web: (1) search engines that return direct hits to sites containing data that match inputted queries, such as AltaVista; (2) Web portals that organize the information into categories and directories, such as Yahoo!. These systems operate using a traditional client-server model with packet-switched data interchange.

Recently, the traditional Web client-server paradigm has been challenged by distributed file-sharing systems that support a peer-to-peer model for exchanging data. In peer-to-peer networks, each computer platform, or node, can operate as a hub, i.e., each node has both client functionality and server functionality. Each node has a list of addresses, most commonly Internet Protocol (IP) addresses, of several other nodes, or "peer nodes". These nodes can directly communicate with each other without a central or intermediate server.

Nodes within a peer-to-peer network form a distributed file-sharing system in which the nodes act cooperatively to form a distributed search engine. When a user at a node enters a search query, the search query is copied and sent to its list of peer nodes. Each peer node searches its own databases in an attempt to satisfy the search query. Each node copies the query to each node in its list of peer nodes while observing a time-to-live value in the query message. If a resulting query hit is made, then the node returns some type of query results to the originating node. The search quickly fans out amongst a large number of nodes, which provides a useful manner for finding new content that has not yet been indexed by the large search engines.

Since the Web is a dynamic environment where content is constantly being added, updated, and changed, it is very difficult for the search engines to be up-to-date. Therefore, it would be advantageous to provide a method and system for augmenting traditional searches of Internet-based content. It would be particularly advantageous to use aspects of peer-to-peer networks to assist in obtaining relevant search results.

SUMMARY OF THE INVENTION

A method, system, apparatus, and computer program product are presented for augmenting conventional search engine results with peer-to-peer search results. Rather than relying solely on an index search in a database that has only indexed a minor portion of the entire World Wide Web, a server-based, peer-to-peer search is initiated in conjunction with the index search. The results from both search processes can be combined so that the user receives an augmented search result with more information than a search result from either process by itself. The entities that are involved in the search can also establish financially rewarding relationships. The server operator agrees to share a percentage of its revenue with peer-to-peer nodes as an incentive to join its registered set of root nodes and expand its peer-to-peer connections. The identified sources of information that provided the search hits can be used by the operator of the search engine in a compensation transaction. While these compensation transactions may be monetary in nature, other compensation schemes may be used, such as reward program points, coupons, micropayments, cashbacks, rebates, frequent flyer miles, etc.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 2A is a block diagram that depicts a simplified, Internet-based connection between two computers;

FIG. 2B is a block diagram that depicts software components within two computers that are operating as nodes within a peer-to-peer network;

FIG. 2C is a block diagram depicting typical software subcomponents within a peer-to-peer software component that contains file sharing functionality;

FIG. 5A is a diagram depicting an example of a graphical user interface window containing search results that have been generated in accordance with a preferred embodiment of the present invention;

FIG. 5B is a diagram showing a set of URLs within the HTML source code of a search result that has been generated in accordance with a preferred embodiment of the present invention;

FIG. 5D is a simple diagram depicting potential transactions between some of the entities or parties after a successful search in accordance with the present invention;

FIG. 6A is a flowchart depicting an overall process for providing an augmented search in accordance with the present invention;

FIG. 6B is a flowchart depicting a process for performing a search-engine-based, peer-to-peer search on behalf of a client in accordance with the present invention;

FIG. 6C is a flowchart depicting a process for compensating an entity that provided information for a successful index search.

DETAILED DESCRIPTION OF THE INVENTION

Figure 1A:
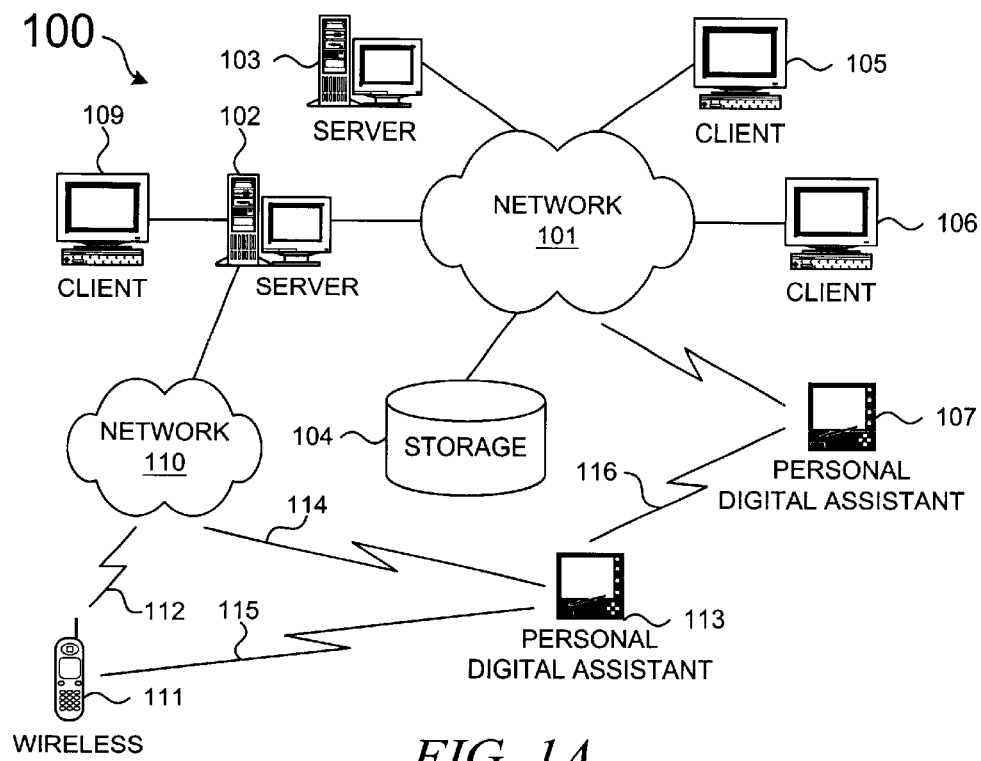
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 117 via wireless communication link 116.

The present invention could be implemented on a variety of hardware platforms; FIG. 1A is intended as an example of a heterogeneous computing environment and not as an architectural limitation for the present invention.

Figure 1B:
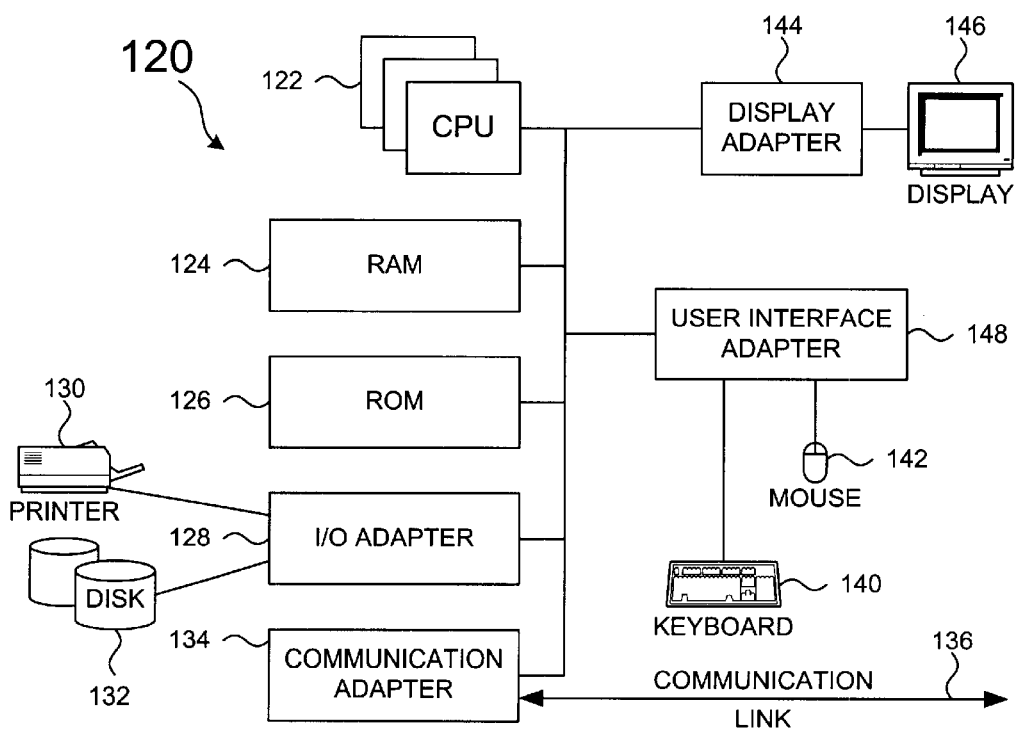
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to providing a method and system for accessing information on a network that includes peer-to-peer networks or subnets. As background, a typical organization of software components within a peer-to-peer network is described prior to describing the present invention in more detail.

With reference now to FIG. 2A, a block diagram depicts a simplified, Internet-based connection between two computers. Computer 202 communicates with ISP (Internet Service Provider) 204 across communication link 206, and computer 208 communicates with ISP 204 across communication link 210. Users of computers 202 and 208 can employ browsers and other networked applications, such as a peer-to-peer file sharing application, to send and receive information across a network, which includes the Internet in this example. Those of ordinary skill in the art will recognize that Internet-based connections between nodes 204 and 208 also may be achieved without using an ISP. For example, a Local Area Network or corporate intranet may be used. The use of an ISP is not intended to be an architectural limitation of the present invention.

With reference now to FIG. 2B, a block diagram depicts software components within two computers that are operating as nodes within a peer-to-peer network. Computer 210 has network-enabled applications 212 that use operating system 214 for various services, such as network communication services provided by communications layer 216. In addition, peer-to-peer component 218 may be a stand-alone applet or an application that provides peer-to-peer networking functionality to computer 210. Communication link 220 supports data traffic between computer 210 and computer 230, which has software components that correspond to those shown in computer 210: applications 232, operating system 234, communications layer 236, and peer-to-peer component 238. Peer-to-peer components 218 and 238 may provide support for a distributed, peer-to-peer file sharing function, as shown in more detail in FIG. 2C.

With reference now to FIG. 2C, a block diagram depicts typical software subcomponents within a peer-to-peer software component that contains file sharing functionality. As noted previously, in peer-to-peer networks, each computer platform, or node, can operate as a hub, i.e., each node has both client functionality and server functionality. Peer-to-peer component 250 contains client subcomponent 252 and server subcomponent 254.

The method by which nodes in a peer-to-peer network connect with each other may vary with the type of peer-to-peer network. Generally, a client is dynamically assigned an IP address by an ISP when the client connects to the ISP, so the IP address possibly changes with each client session. In some implementations, a peer-to-peer connection between nodes in a peer-to-peer network is initiated when a user at a node manually enters either a domain name or an IP address (and optionally a port number) of an application of another node that is known to support peer-to-peer networking. The peer-to-peer application then establishes a connection with the other node at the specified address as a starting point within the network. For example, applications using the Gnutella protocol operate in this manner. Gnutella nodes also exchange connection speed, such as connection speed 256, that describe the speed of the network connection that is being used by the node. It should be noted, however, that the present invention can be implemented on a variety of peer-to-peer networks and is not limited by the peer-to-peer protocol that is used by the file sharing applications.

Nodes within a peer-to-peer network can act as a distributed file sharing system in which the nodes act cooperatively to form a distributed search engine. Client subcomponent 252 contains input query processing function 258 and search result processing function 260. When a user at a node enters a search query, the search query is copied to a list of peer nodes to which the node is connected, such as connection host list 262.

When a node receives the query, its server component, such as server component 254, processes the query. Each peer node searches its own databases in an attempt to satisfy the search query. Alternatively, a user has previously specified a list of files that the user is willing to export or share, such as file list 264, and the server subcomponent searches this list to find one or more files that satisfy the search query. Alternatively, rather than searching through a list of file names, the application may search the node's permanent storage for content that matches the search query. Depending on certain parameters within the query message, the node also forwards the query, e.g., by using message processing subcomponent 266, to each node in its list of connected peer nodes. If a resulting query hit is made, then the node returns some form of query results to the peer node that contacted it or to the originating node. In this manner, the search quickly fans out amongst a large number of nodes.

Figure 2D:
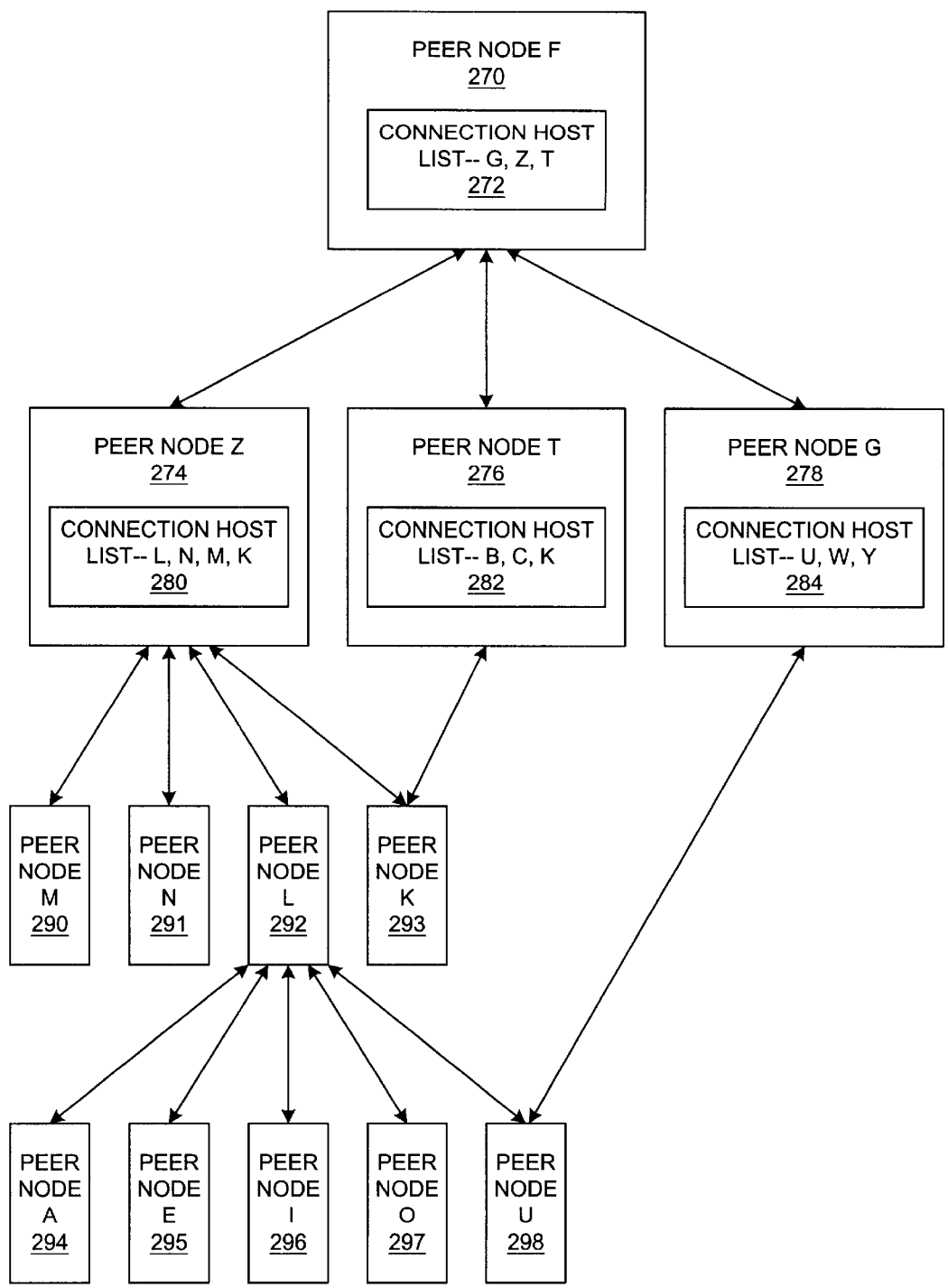
FIG. 2D is a block diagram depicting a typical network topology of nodes within a peer-to-peer network.

With reference now to FIG. 2D, a block diagram depicts a typical network topology of nodes within a peer-to-peer network. Peer node 270 has a connection host list 272 that identifies nodes 274–278 to which peer node 270 is connected, and nodes 274–278 have their own connection host lists 280–284, respectively. In this example, node 274 connects to nodes 290–293, and node 292 connects with nodes 294–298.

It should be noted that peer-to-peer networks do not have a structured topology, such as a strictly hierarchical organization amongst the nodes. In this example, node 276 also connects with node 293, and node 278 also connects with node 298. However, in order to distinguish immediately connected nodes from distant nodes, the set of nodes to which a particular node connects may be termed the "root nodes" of the particular node.

As noted above, the present invention is not limited to any particular peer-to-peer protocol that is used to implement the present invention. As background information, though, the Gnutella protocol is described in more detail as an example of the manner in which information may be passed in a peer-to-peer network between nodes that support a file sharing application. Reference may be made to the above description for FIG. 2C and FIG. 2D for components that would support file sharing within a peer-to-peer network using a protocol similar to Gnutella.

Gnutella is an Internet-based file searching/sharing program that combines both search engine functionality and file server functionality in a single application. When a user enters a search term into a Gnutella-enabled application at a node in the peer-to-peer network, a query message is generated with the appropriately formatted information, and the message is sent as a network packet to the user node's connected peers, i.e., peer nodes with which the user's node has already established a connection or session. Special codes within a Gnutella message header indicate the type of message, and each type of message has a unique code.

Any node within a certain distance from the user's node in the peer-to-peer network, i.e., within a certain node "hop count", will receive the query message; there is no mechanism to kill a query. As a query message moves through the connected nodes, a time-to-live (TTL) data field, which represents the hop count, is decremented. If the TTL field reaches zero, then the receiving node should not forward the query message, i.e., it should "drop the packet". Otherwise, the receiving node forwards the query message.

Each message contains a Globally Unique Identifier (GUID). When a new message is generated, a new GUID is also generated and placed within the new message. The manner in which the GUID is generated is not specifically specified by the Gnutella standard. When any message is received, the GUID is compared to a list of GUIDs, each of which were stored when its corresponding message was received. If the GUID is in the list, this fact indicates that the receiving node has seen this particular message previously because the GUIDs are supposed to be unique. Hence, if the GUID is in the list, then the node should not forward the received message because the receiving node's peer nodes would have also seen the message, and the packet can be dropped.

In addition, if the receiving node can fulfill the query, then the node creates a query hit (query reply) message and returns it to the node that originated the query message. The query hit message contains the address and port number of the responding node so that the originating node can send a message back to the responding node to retrieve a file if desired. The query hit message also contains the connection speed of the responding node and the number of search hits. For each query hit, the query hit message also contains the name of the file that satisfies the query and the size of that file. Other information may be included, such as length of the data content within the message, etc.

Assuming that the originating node has sufficient communication bandwidth, the results of the search should be received within a relatively short amount of time. The search results are stored or cached as they are received. The Gnutella-enabled application then presents the search results to the user in some fashion, and the user may select, through some type of user interface in the application, a filename that the user desires to retrieve. The application, which has stored the search results that include one or more nodes that responded with a search hit, can download a selected file to the user's node. Simple HTTP messages can be used for the download operation, such as a "Get" or a "Put" message (for a Gnutella "Push" request).

The Gnutella protocol operates without a central server. Unlike typical search engines, Gnutella searches anonymously, and there is no index. There is also no authentication process nor authorization process. There are other types of messages within the Gnutella protocol, such as "Ping" and "Pong", for discovering other nodes on the network and for responding to "Ping" messages. Additionally, a "Push" request message allows a node within the network but behind a firewall to be contacted to push a file to the outside of the firewall rather than attempting to pull the file from inside the firewall. It should be noted that the Gnutella protocol specification is an open specification and is subject to modification and fragmentation over time.

Figure 3:
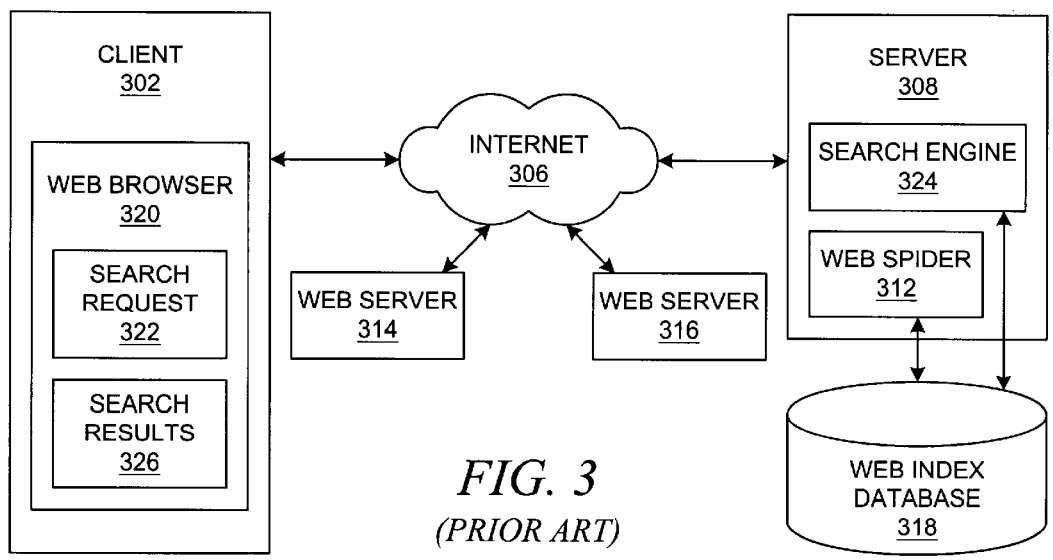
FIG. 3 depicts a typical, Web-based, indexing-type, search engine.

With reference now to FIG. 3, a typical, Web-based, indexing-type, search engine is depicted. Client 302 connects via communication link 304 to the Internet 306, and server 308 connects via communication link 310 to the Internet 306. Server 308 supports Web spider 312, which "crawls" the World Wide Web by following hyperlinks within Web pages or some other means in order to retrieve Web pages and other content from servers 314 and 316. The data gathered by the Web crawler is then indexed and stored within Web index database 318. Certain Web portals perform the indexing process continually.

At some point in time, a user at client 302 may desire to perform a search for specific content on the Web. The user operates Web browser application 320, or some other type of Internet-enabled or Web-enabled application, to retrieve a Web page from server 308 containing a search form for entering a search request or query 322. The user enters a search string, and the search request is sent to search engine 324 on server 308 in an appropriate format, such an HTTP message. The search engine searches through the previously generated index for content that satisfies the user query. If a query hit is generated, then the search results are returned to client 302, and the browser application displays the results for the user. The user may view the list of results and may determine whether or not to view the entire contents for an item prior to downloaded the item. In general, the search process is free, but various portals make a profit by selling advertising on their Web site.

Figure 4:
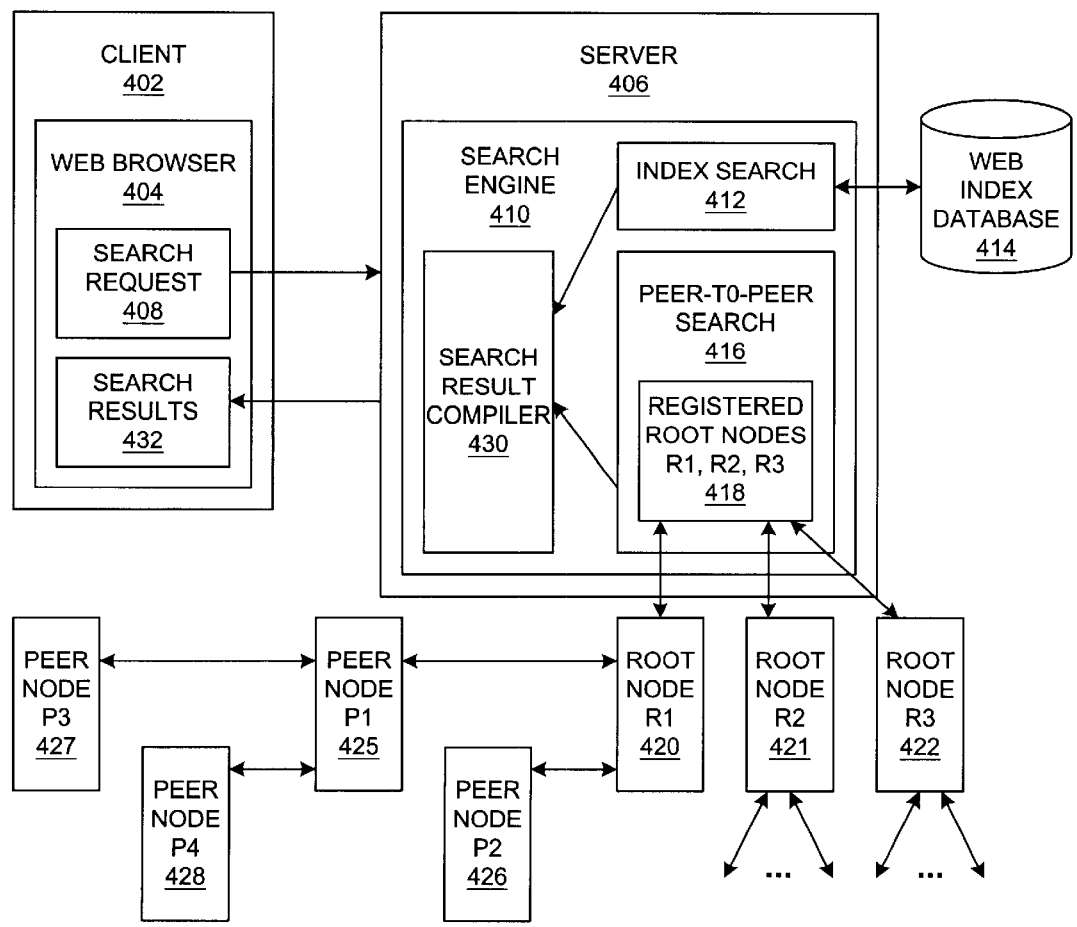
FIG. 4 depicts a search engine system in accordance with a preferred embodiment of the present invention.

With reference now to FIG. 4, a search engine is depicted in accordance with a preferred embodiment of the present invention. In a manner similar to that shown in FIG. 3, FIG. 4 shows client 402 executing Web browser 404 to send and receive information from server 406. At some point in time, a user at client 402 operates Web browser 404 to enter search request 408. Client 402 sends the search query in an appropriate format to search engine 410 on server 406. Search engine 410, or alternatively some other component on server 406 or some other component operating in cooperation with server 406, has previously completed a Web-crawling or spidering process. In response to the user's search request, search engine 410 uses index search facility 412 to search through Web index database 414.

In contrast to the prior art, search engine 410 also uses peer-to-peer search facility 416 to conduct a server-based, distributed search process on a peer-to-peer network in conjunction with a conventional index search. Search engine 410 may conduct the peer-to-peer search and the index search sequentially or simultaneously. Rather than relying solely on an index search in a database that has only indexed a minor portion of the entire World Wide Web, the present invention also employs a server-based, peer-to-peer search in conjunction with the index search.

The peer-to-peer search process uses registered root node list 418 as its connection host list. During some preceding period of time, the operator of server 406, e.g., a commercial Web site, has accepted registrations from users who desire to act as root nodes within the operator's peer-to-peer network. As is well-known in the art, a Web site can allow a user to register at the Web site, thereby creating some type of personal account for the user that is probably stored on a server within the Web site's domain. When the user registers with the server operator, search engine service, or other entity as necessary, the user supplies both technical information and optional personal information.

The user must supply technical information so that the server can establish a peer-to-peer connection with the user's computer or similar device. The technical information may include an IP address, a port number, and other data items. Alternatively, the user supplies some sort of electronic address that is eventually transformable into a destination address within a network protocol. Hence, other types of addresses in place of or in addition to IP addresses may be used as appropriate. For example, the user might supply a domain name address, which can be translated into an IP address through a domain name server in the Domain Name System (DNS). In that case, the server may be configured to accept many different kinds of traffic in addition to peer-to-peer networking traffic, but because the server can discern peer-to-peer packets, the server can process peer-to-peer packets appropriately while also processing Web-page requests and other types of data traffic.

Most peer-to-peer networks operate in an anonymous fashion. However, in order to protect the reputation of the Web site, the Web site operator might also require that a registered root node must be associated with a person. This will enable the Web site operator to maintain the integrity of the search process and to communicate with the operators of the registered nodes. The user might supply personal information that may include such data items as name, address, age, e-mail address, phone number, etc.

In addition, a preferred embodiment of the present invention would request that a registered operator of a root node should supply preference information for compensation transactions. This feature is described in more detail with respect to FIG. 5D and FIG. 5E further below.

Peer-to-peer search facility 416 generates a query message containing a search query that is identical to or similar to the original search query that was received from client 402. Because of the nature of a peer-to-peer network and its ability to generate results that are not within the control of server 406, it may be necessary to adjust the search query in some manner prior to sending it to the root nodes. For example, a broad search query sent to many nodes could quickly overwhelm the ability of server 406 to accept the responses that a broad search query could trigger; the communication links to server 406 would quickly experience data traffic similar to a denial-of-service attack. Hence, the search query that is sent to the registered nodes is not necessarily the same as the original search query that was sent from client 402. Search engine 410 may run the original search query through some type of filter prior to initiating the peer-to-peer search.

The newly generated query message is then sent to each of the root nodes 425–428. The number of connection hosts that are used in the peer-to-peer search may depend on a variety of factors. For example, the list of registered root nodes may comprise many thousands of nodes, and employing too many nodes in the peer-to-peer search could quickly overwhelm the ability of server 406 to accept the responses. Hence, search engine 410 may perform a preliminary culling process on the list of registered root nodes prior to initiating the peer-to-peer search.

Assuming that the peer-to-peer search is at least partially successful, search engine 410 receives a set of results from one or more nodes in the peer-to-peer search. These results, along with the results from the index search, are meshed in some manner by search result compilation/merge facility 430. A formatted presentation of the results, such as a Web page containing references to the search hits, is returned to Web browser 404. The user at client 402 may then view or process search results 432. The results from both search processes can be merged or combined so that the user receives an augmented search result with more information than a search result that would be produced by either search process individually.

With reference now to FIG. 5A, a diagram depicts an example of a graphical user interface window containing search results that have been generated in accordance with a preferred embodiment of the present invention. Window 500 contains a title bar showing the name of the browser application and the title of the Web page that is being view at a particular Web site. Menu bar 504 contains typical application menus, and buttons 506 are typical buttons for requesting actions within the browser application. Vertical scroll bar 508 allows the user to view more than one screen of information.

A user can enter a search query into text entry field 510, and the search query is executed by selecting button 512, after which the browser application sends the search query to a server containing a search engine similar to search engine 410 shown in FIG. 4. After a relatively brief period of time, search results 514 would appear to the user after being received from the server.

In this example, three search hits are shown. Enumerated hyperlinks 516, 518, and 520 contain the title of the Web page or other file or document that matched the search query or otherwise caused the search hit. Uniform Resource Locators (URLs) 522–526 provide the Web site address of the document or file for each search hit; these may optionally be hyperlinks to the Web site.

In the prior art, publicly available search engines format the search results in many different ways, but they generally enumerate each search hit or distinguish each search hit in some way so that the user can retrieve the document or file associated with the search hit. In addition, a short summary of the search hit may be provided. In a similar manner, search summary lines 528–532 provide a short summary of the search hit; in the example in FIG. 5A, a category of the type of information within the search hit is provided along with a date associated with the search hit information, such as a copyright date for the information if encoded within the information, e.g., by using a special HTML tag within a Web page.

In contrast with prior art systems, search summary lines 528–532 indicate the type of search that generated the search hit. In the present invention, a distributed, file-sharing-type search on a peer-to-peer network is accomplished by a server executing the search engine along with a conventional search of an index database. The user is thus provided with a search result that has been augmented with additional information. As noted previously, rather than relying solely on an index search in a database that has only indexed a minor portion of the entire World Wide Web, the present invention also employs a server-based, peer-to-peer search in conjunction with the index search. The results from both search processes are combined so that the user receives an augmented search result with more information than a search result that would be produced by either search process individually. In addition, the user has the benefit of receiving search results which are (optimistically) more up-to-date than an indexed search.

With reference now to FIG. 5B, a diagram shows a set of URLs within the HTML source code of a search result that has been generated in accordance with a preferred embodiment of the present invention. In this example, two anchor links are shown as HTML-formatted tags. Each tag contains an "HREF" attribute that specifies the URL associated with the anchor, making the anchor into a hyperlink when displayed. Tag 540 is associated with the index search hit for search summary line 516 shown in FIG. 5A. Tag 542 is associated with the index search hit for summary line 520. Other HTML tag attributes can be used to provide the text that is displayed to the user as the hyperlink.

In this example, the URL contains information about the URL that caused the search hit along with information for allowing the search engine server to locate the stored search result. Portion 544 specifies the Web address of the search engine server that is responsible for retrieving the search results, which may be handled by a separate server within the same domain. Portion 546 specifies search result location information that associates the stored search results with the search hit shown in the Web page. Portion 548 indicates the Web address associated with the information that caused the search hit. The information within the URLs may vary with the manner in which the server stores the search results.

In some prior art search results, the hyperlink associated with a search hit merely specifies the Web site of the information. In the present invention, the actions that may occur when the user selects one of the enumerated hyperlinks 516, 518, and 520 can vary with the implementation of the invention.

In the case of the index search, the user's browser application may receive an HTTP "Redirect" message that redirects the browser to the Web page indicated as URLs 522–526.

A user generally does not notice a redirect operation. Hence, in the present invention, if a redirect mechanism is employed, the next Web page that the user sees would not be different than the case in which the hyperlink associated with a search hit merely specifies the Web site of the information. However, by encoding the enumerated search hit with the search result within a special URL, the server is notified that the user has selected the URL. The user selection can be assumed to be significant because the user selection presumably shows that the user seemed to think that the search hit was relevant. The server can store this information for subsequent analysis for a variety of reasons, such as optimizing its searching capabilities.

Moreover, the user selection can be used as a factor in determining the type and/or magnitude for a compensation transaction that should subsequently occur in association with the search hit. Again, the importance of the optional compensation transaction feature of the present invention is explained in more detail further below.

In the case of the peer-to-peer search, the actions that may occur when the user selects enumerated hyperlink 520 can vary, and the user's browser application may receive a message similar to an HTTP "Redirect" message that redirects the browser to the node that originated the search hit, in which case the client would then contact the node. Depending upon the implementation, the peer-to-peer networking protocol may require a unique message type for this functionality. Otherwise, when the user selects hyperlink 520, the server may download the information and then reroute the information to the client.

Figure 5C:
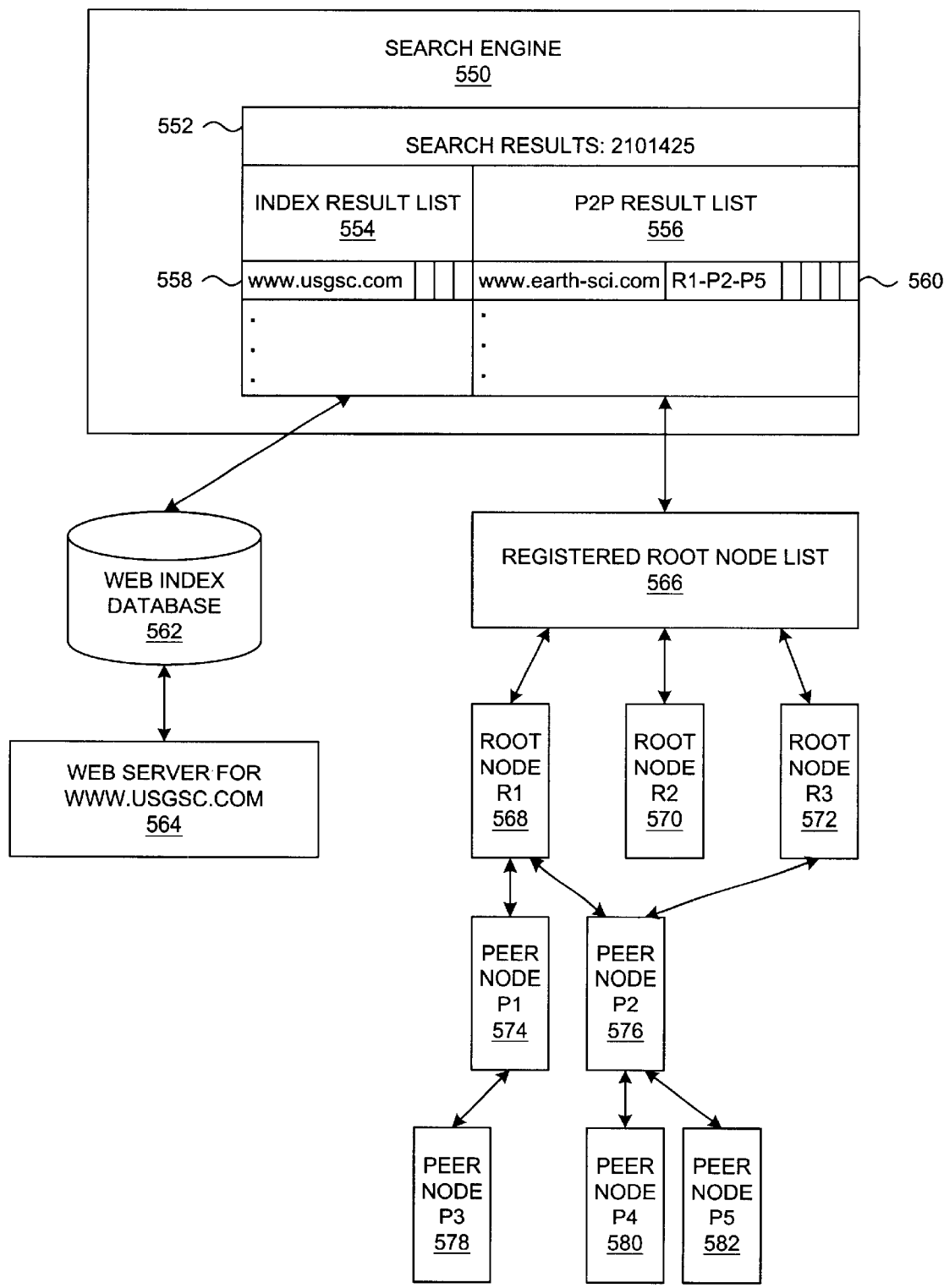
FIG. 5C is a block diagram depicting the system from the server-side perspective after successfully processing a search query.

With reference now to FIG. 5C, a block diagram depicts a search engine system of the present invention from a server-side perspective after successfully processing a search query. Search engine 550 may cache a set of search results, including search results 552, which contains index result list 554 from searching the index database and peer-to-peer result list 556 from a parallel search on the peer-to-peer network. Index result list 554 contains search hit information 558 that corresponds to enumerated search hit 516 in FIG. 5A. Peer-to-peer result list 556 contains search hit information 560 that corresponds to enumerated search hit 520 in FIG. 5A.

More specifically, FIG. 5C shows the sources within the distributed network for the documents, files, or other information that resulted in the search hits. Web index database 562 contains indexed information that was previously culled from Web server 564; in the example, search hit information 558 is derived from the information stored by server 564. Search engine 550 has used registered root node list 566 to initiate a peer-to-peer network search on root nodes 568–572 and other nodes 574–582; in the example, search hit information 560 is derived from the information stored on nodes 568, 576, and 582.

With reference now to FIG. 5D, a simple diagram depicts potential transactions between some of the entities or parties after a successful search in accordance with the present invention. As described with respect to FIG. 5C, persons other than the search engine operator have ultimately supplied information that a user of the search engine found valuable. As described with respect to FIG. 5A and FIG. 5B, the user selection of a search hit can be determined as being valuable. Hence, the search engine operator can initiate some type of a compensation transaction in association with the search hit. The compensation mechanism may be graduated depending on whether or not the search hit is downloaded in full.

From one perspective, the search engine is performing the peer-to-peer network search on behalf of the user. The operator of the search engine has, most likely, placed advertisements on the Web pages that are being viewed by the user of the search engine, thereby enabling the operator of the search engine to make a profit. The operator may have other types of revenue that is related to its operation of the search engine.

However, the load on the server for performing the computationally intensive search has been reduced by utilizing the registered root nodes of the server. Hence, the registered root nodes have provided a benefit to the server that enables the server operator to make a profit.

The present invention recognizes this fact and enables the entities to establish financially rewarding relationships. The server operator agrees to share a percentage of its revenue with nodes as an incentive to join its registered set of root nodes and expand its peer-to-peer connections.

Root nodes that have high bandwidth connections and many links to other nodes may have significant physical resources dedicated to the operation of peer-to-peer functions. However, these nodes are most likely to benefit from a compensation scheme as they may perform more operations that result in more relevant search hits. The compensation scheme can be structured to take such characteristics into consideration.

The identified sources of information that provided the search hits can be used by the operator of the search engine in a compensation transaction. As noted previously, a preferred embodiment of the present invention would request that a registered operator/owner of a root node should supply preference and personal information for compensation transactions. While these compensation transactions may be monetary in nature, other compensation schemes may be used, such as reward program points, coupons, micropayments, cashbacks, rebates, frequent flyer miles, etc. The registered operator/owner can supply a indication as to the preferred type of compensation. In addition, information such as a bank account number, reward program account number, etc., may be needed to complete the compensation transaction.

Referring again to FIG. 5D, search engine owner/operator 590 would compensate the owner/operator of registered root node 592. In addition, search engine owner/operator 590 may compensate Web site owner/operator 591. To do so, Web site owner/operator 591 may have to register with the search engine operator in some manner.

Owners/operators of nodes 593 and 594 have also assisted in the successful peer-to-peer search. These nodes can be discovered at search time by determining the topology/interconnections of the peer-to-peer network. These other nodes can then be invited by the search engine operator to join its network as registered root nodes so as to expand its peer-to-peer connections and increase its effectiveness during a peer-to-peer search.

Alternatively, although contrary to an anonymous protocol, the registered root node can report the addresses of its connections to the search engine. The manner in which other nodes can be invited to join the search engine's connection host list can vary depending upon the implementation of the present invention.

Figure 6D:
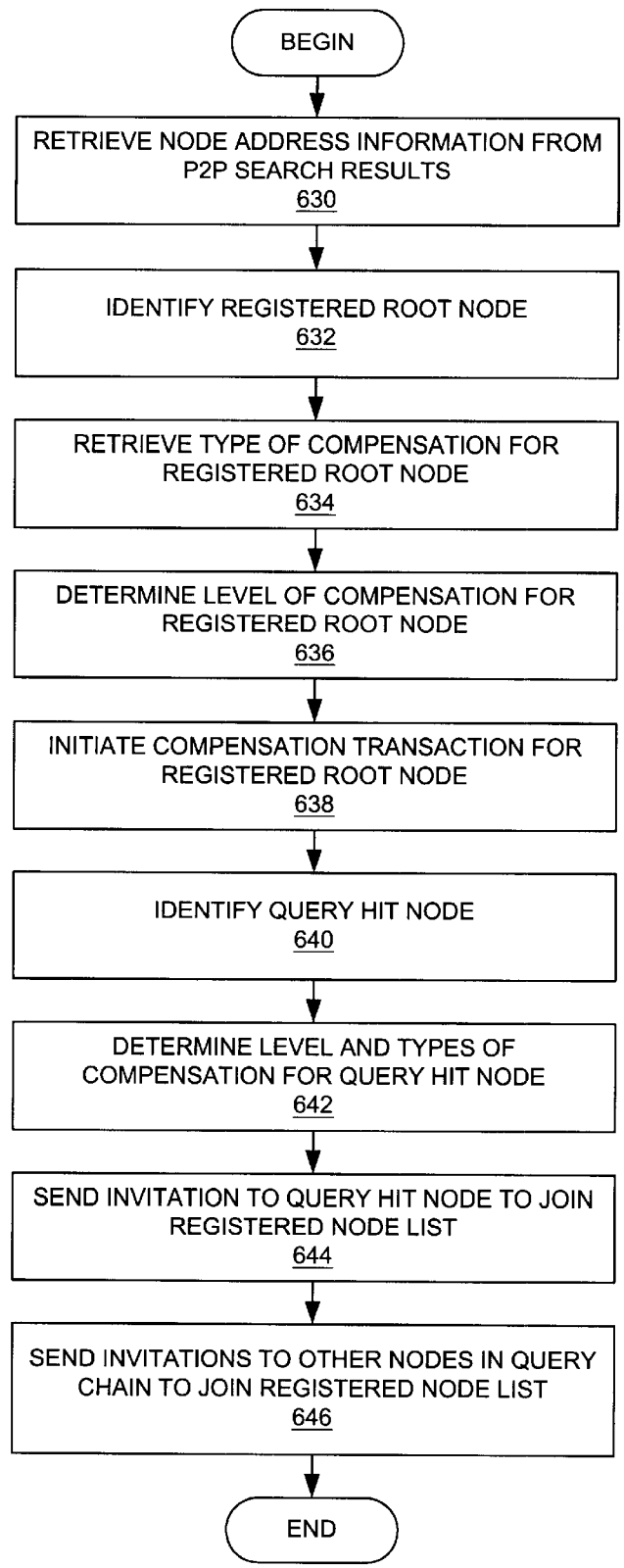
FIG. 6D is a flowchart depicting a process for compensating an entity that provided information for a successful search-engine-based, peer-to-peer search.

With reference now to FIG. 6A, a flowchart depicts an overall process for providing an augmented search in accordance with the present invention. The process begins when the server receives a search request and forwards its request to its search engine component (step 602). In response, the search engine initiates both an index search and a peer-to-peer search (step 604). The search engine then compiles or merges the search results from the index search and the peer-to-peer search (step 606). The server sends the combined search results to the originating client (step 608), and the overall process is complete. However, an additional compensation process, as shown in FIG. 6C and FIG. 6D, may optionally be completed.

With reference now to FIG. 6B, a flowchart depicts a process for performing a search-engine-based, peer-to-peer search on behalf of a client in accordance with the present invention. The process begins by the search engine retrieves the addresses of the registered nodes from the registration database (step 610). The server then sends a query message to each registered node, i.e. root nodes (step 612). At some subsequent point in time, the server receives one or more query response messages from the nodes in the peer-to-peer network (step 614). The search engine parses the response messages to retrieve query hit information and responding node address information (step 616). The search engine then stores the node address information for subsequent use, i.e. client-side or server-side downloading (file sharing) of the information (step 618), and the process is complete.

With reference now to FIG. 6C, a flowchart depicts a process for compensating an entity that provided information for a successful index search. The process begins when the search engine server parses the index search results and retrieves domain names of the domains from which the server has gathered information (step 620). The server identifies the owners/operators of those domains in some manner (step 622). The server then performs a compensation transaction for the identified domain operator or owner (step 624), and the process is then complete.

With reference now to FIG. 6D, a flowchart depicts a process for compensating an entity that provided information for a successful search-engine-based, peer-to-peer search. The process begins when the search-engine/server retrieves node address information from the peer-to-peer search results (step 630) and identifies the registered root nodes within the search results (step 632). The server then retrieves the preferred type of compensation for the registered root node (step 634) and determines the level of compensation for the registered root node (step 636). The server, through some type of electronic mechanism, initiates a compensation transaction for the registered root node (step 638). The server may then identify the query hit nodes that provided information for the successfully completed search (step 640) and may determine types and amounts of compensation for the node's participation (step 642). The server may then send an invitation to the query hit node to join the registered root node list, i.e. connection host list (step 644). The invitation can indicate the types and levels of compensation that are available to entice the root node operator to join in the server's peer-to-peer network node list. The server may also send invitations to other nodes in the query chain through the peer-to-peer network so that those nodes may also be enticed to join the registered node list (step 646), and the process is then complete.

The advantages of the present invention should be apparent in view of the detailed description of the invention that is provided above. Rather than relying solely on an index search in a database that has only indexed a minor portion of the entire World Wide Web, the present invention also employs a server-based, peer-to-peer search in conjunction with the index search. The results from both search processes can be combined so that the user receives an augmented search result with more information than a search result from either process by itself.

The present invention also enables the entities that are involved in the search to establish financially rewarding relationships. The server operator agrees to share a percentage of its revenue with nodes as an incentive to join its registered set of root nodes and expand its peer-to-peer connections. The identified sources of information that provided the search hits can be used by the operator of the search engine in a compensation transaction. While these compensation transactions may be monetary in nature, other compensation schemes may be used, such as reward program points, coupons, micropayments, cashbacks, rebates, frequent flyer miles, etc. The registered operator/owner can supply a indication as to the preferred type of compensation. In addition, information such as a bank account number, reward program account number, etc., may be needed to complete the compensation transaction.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for searching for information within a distributed data processing system, the method comprising:

receiving, at a server, a search query message comprising a search query from a client;

performing a server-based index search in accordance with the search query;

initiating a server-based peer-to-peer search in accordance with the search query;

receiving, at the server, a search result message for the server-based peer-to-peer search;

merging result data from the server-based index search and result data from the server-based peer-to-peer search to generate result information;

generating a result message with the result information; and returning the result message to the client.

2. The method of claim 1 further comprising:

retrieving, at the client, a file associated with result data from the server-based peer-to-peer search.

3. The method of claim 1 further comprising:

retrieving, at the server, a file associated with result data from the server-based peer-to-peer search; and forwarding the file to the client.

4. The method of claim 1 further comprising:

identifying a source for result data from the server-based peer-to-peer search;

determining an operator associated with the source; and compensating the operator for participating in the server-based peer-to-peer search.

5. The method of claim 4 further comprising:

detecting whether the client requests additional information from the server-based peer-to-peer search; and computing an amount of compensation in response to the client requesting additional information.

6. An apparatus for searching for information within a distributed data processing system, the apparatus comprising:

first receiving means for receiving, at a server, a search query message comprising a search query from a client;

performing means for performing a server-based index search in accordance with the search query;

initiating means for initiating a server-based peer-to-peer search in accordance with the search query;

second receiving means for receiving, at the server, a search result message for the server-based peer-to-peer search;

merging means for merging result data from the server-based index search and result data from the server-based peer-to-peer search to generate result information;

generating means for generating a result message with the result information; and returning means for returning the result message to the client.

7. The apparatus of claim 6 further comprising:

first retrieving means for retrieving, at the client, a file associated with result data from the server-based peer-to-peer search.

8. The apparatus of claim 6 further comprising:

second retrieving means for retrieving, at the server, a file associated with result data from the server-based peer-to-peer search; and forwarding means for forwarding the file to the client.

9. The apparatus of claim 6 further comprising:

identifying means for identifying a source for result data from the server-based peer-to-peer search;

determining means for determining an operator associated with the source; and compensating means for compensating the operator for participating in the server-based peer-to-peer search.

10. The apparatus of claim 9 further comprising:

detecting means for detecting whether the client requests additional information from the server-based peer-to-peer search; and computing means for computing an amount of compensation in response to the client requesting additional information.

11. A computer program product on a computer readable medium for use in a distributed data processing system for searching for information within the distributed data processing system, the computer program product comprising:

instructions for receiving, at a server, a search query message comprising a search query from a client;

instructions for performing a server-based index search in accordance with the search query;

instructions for initiating a server-based peer-to-peer search in accordance with the search query;

instructions for receiving, at the server, a search result message for the server-based peer-to-peer search;

instructions for merging result data from the server-based index search and result data from the server-based peer-to-peer search to generate result information;

instructions for generating a result message with the result information; and instructions for returning the result message to the client.

12. The computer program product of claim 11 further comprising:

instructions for retrieving, at the client, a file associated with result data from the server-based peer-to-peer search.

13. The computer program product of claim 11 further comprising:

instructions for retrieving, at the server, a file associated with result data from the server-based peer-to-peer search; and instructions for forwarding the file to the client.

14. The computer program product of claim 11 further comprising:

instructions for identifying a source for result data from the server-based peer-to-peer search;

instructions for determining an operator associated with the source; and instructions for compensating the operator for participating in the server-based peer-to-peer search.

15. The computer program product of claim 14 further comprising:

instructions for detecting whether the client requests additional information from the server-based peer-to-peer search; and instructions for computing an amount of compensation in response to the client requesting additional information.

* * * * *